United States Patent [19]

Minamoto et al.

[11] Patent Number: 5,402,628
[45] Date of Patent: Apr. 4, 1995

[54] MOWING MACHINE WITH TILTABLE WHEELS AND CONTROL HANDLE

[75] Inventors: Takasi Minamoto; Masato Yamagishi, both of Hokkaido; Yuji Furusawa, Saitama; Akihiko Anbo, Iwate, all of Japan

[73] Assignee: Honda Giken Kogyo Kabushiki Kaisha, Tokyo, Japan

[21] Appl. No.: 74,456

[22] Filed: Jun. 10, 1993

[30] Foreign Application Priority Data

Jun. 10, 1992 [JP] Japan ................... 4-175024
Mar. 10, 1993 [JP] Japan ............... 5-010171 U

[51] Int. Cl.6 .............................................. A01D 34/86
[52] U.S. Cl. ...................... 56/17.1; 56/17.2; 56/DIG. 10
[58] Field of Search ............... 56/10.1, 15.7, 15.8, 56/15.9, 16.2, 16.3, 17.2, DIG. 2, DIG. 3, DIG. 10, DIG. 22

[56] References Cited

U.S. PATENT DOCUMENTS

| | | | |
|---|---|---|---|
| 3,154,903 | 11/1964 | Smith | 56/15.8 |
| 3,375,645 | 6/1965 | Miller | 56/15.8 |
| 4,316,356 | 2/1982 | Planeta | 56/16.2 |
| 4,707,971 | 11/1987 | Forpahl et al. | 56/6 |
| 4,869,054 | 9/1989 | Hostetler et al. | 56/6 |
| 5,085,042 | 2/1992 | Landowne | 56/6 |

Primary Examiner—Ramon S. Britts
Assistant Examiner—Pamela O'Connor
Attorney, Agent, or Firm—Dickstein, Shapiro & Morin

[57] ABSTRACT

A mowing machine has a machine frame, front and rear wheels rotatably mounted on the machine frame, a control handle mounted on the machine frame, and a cutting assembly suspended by the machine frame for angular movement about a swing axis extending along a direction in which the mowing machine can travel straight. The front and rear wheels comprise single wheels, respectively, so that the mowing machine is two-wheeled. The machine frame, the front and rear wheels, and the control handle jointly serve as a non-swingable section, and the cutting assembly serves as a swingable section, the swingable section being suspended in offset relationship to the swing axis, the swingable section including a guide member for keeping the cutting assembly spaced from ground. The mowing machine may further include an angular range limiting mechanism for limiting the range of angular movement of the swingable section. The angular range limiting mechanism is capable of selecting one, at a time, of a plurality of modes representing respective angular ranges, the modes including a mode whose angular range is substantially nil with the swingable section being fixed to the non-swingable section.

19 Claims, 15 Drawing Sheets

MOWING MACHINE WITH TILTABLE WHEELS AND CONTROL HANDLE

BACKGROUND OF THE INVENTION

1. Field of the Invention

The present invention relates to a mowing machine suitable for cutting the grass on flat fields, ridges between rice fields, or grass fields including slanted surfaces.

2. Description of the Prior Art

Weeds on fields, particularly on ridges between rice fields, have to be cut several times a year because they are responsible for providing a nest of vermin. Heretofore, various mowing machines have been proposed to help farmers cut weeds.

Japanese utility model publication No. 61-40099 discloses a self-propelled mowing machine having a machine body supported by four front and rear wheels, an engine and a cutting blade which are supported on the machine body. When a slanted surface of a ridge is to be mowed, the disclosed mowing machine is tilted as a whole so as to adapt itself to the slanted surface. The disclosed mowing machine is characterized in that the lateral spacing between the wheels can be reduced if the slanted surface is relatively small.

FIG. 16 of the accompanying drawings shows an ideal ridge in cross section, and FIG. 17 of the accompanying drawings shows an actual ridge in cross section.

In FIG. 16, a ridge 90 has a cross-sectional shape of an isosceles trapezoid including an upper surface 101 and a pair of opposite slanted surfaces 102. A four-wheeled mowing machine 103 that is in an inclined position P on one of the slanted surfaces 102 is possible to cut the grass on that slanted surface 102 provided the user securely grips a handle 105. The four-wheeled mowing machine 103 that is in a position Q on the upper surface 101 is also possible to cut the grass on the upper surface 101 also provided the user securely grips the handle 105.

Actually, most ridges have round corners as indicated by 110 in FIG. 17. The ridge 110 has no sharp edges for preventing the wheels of the mowing machine 103 from laterally skidding downwardly. Even if the user of the mowing machine 103 strongly holds the handle 105 and attempts to keep the mowing machine 103 vertically on the upper surface of the ridge 110, the mowing machine 103 tends to slip laterally and fall as indicated by the arrow. Since an engine 106 is positioned above a cutting blade 104 (see FIG. 16), the center of gravity of the mowing machine 103 is so high that the mowing machine 103 is liable to fall in use. Therefore, the conventional four-wheeled mowing machine 103 places a large physical and mental burden on the user while it is in use.

SUMMARY OF THE INVENTION

It is therefore an object of the present invention to provide a mowing machine capable of cutting the grass on flat fields, ridges between rice fields, or grass fields including slanted surfaces, and also of mowing ridges with round corners without physically and mentally stressing the user of the mowing machine.

According to the present invention, there is provided a mowing machine comprising a machine frame, front and rear wheels rotatably mounted on said machine frame, a control handle mounted on said machine frame, and a cutting assembly suspended by said machine frame for angular movement about a swing axis extending along a direction in which the mowing machine can travel straight. The front and rear wheels may comprise single wheels, respectively, so that the mowing machine is two-wheeled. The machine frame, said front and rear wheels, and said control handle jointly serve as a non-swingable section, and said cutting assembly serves as a swingable section, said swingable section being suspended in offset relationship to said swing axis, said swingable section including a guide member for keeping said cutting assembly spaced from ground.

The swingable section is swingable about said swing axis with respect to said non-swingable section, said swingable section further including an engine assembly having at least an engine for supplying drive power to said cutting assembly and said rear wheel as a drive wheel. The engine assembly has a center of gravity positioned on one side of said swing axis, and said cutting assembly has a center of gravity positioned on the other side of said swing axis.

The mowing machine may further include an angular range limiting mechanism for limiting the range of angular movement of said swingable section. The angular range limiting mechanism is capable of selecting one, at a time, of a plurality of modes representing respective angular ranges, said modes including a mode whose angular range is substantially nil with said swingable section being fixed to said non-swingable section.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
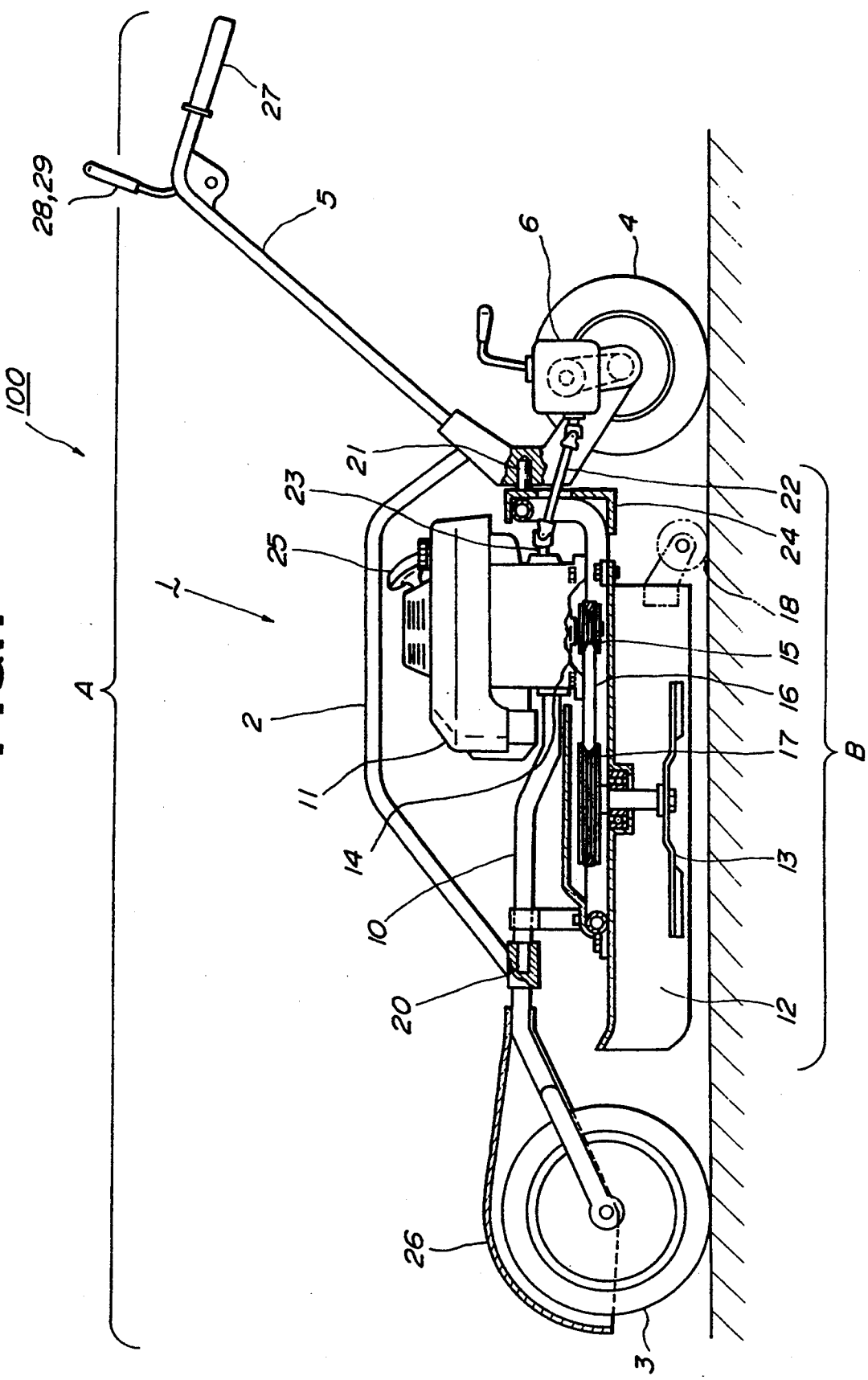
FIG. 1 is a side elevational view, partly in cross section, of a mowing machine according to a first embodiment of the present invention.

As shown in FIG. 1, a mowing machine 100 according to a first embodiment of the present invention generally comprises a non-swingable section A and a swingable section B. The non-swingable section A comprises a substantially inverted U-shaped machine frame 2 curved in a longitudinal direction, front and rear wheels 3, 4 mounted on front and rear ends of the machine frame 2, the rear wheel 4 serving as a drive wheel, a control handle 5 extending obliquely upwardly rearwardly from the machine frame 2, and a rear wheel gear case unit 6 integrally coupled to the control handle 5.

The swingable section B comprises an engine mount pipe 10, a vertical-crankshaft engine 11 mounted on the engine mount pipe 10 or an engine mount base 10a (see FIG. 7) fixed to the engine mount pipe 10, a cutter housing 12 positioned underneath and bolted to the engine mount pipe 10, a cutting blade 13 housed in the cutter housing 12 for rotation in a horizontal plane, a transmission mechanism including a small pulley 15, a belt 16, and a large pulley 17 for transmitting engine power from a crankshaft 14 of the engine 11 to the cutting blade 13, a guide member 18 rotatably mounted on a side (see FIG. 2) of the cutter housing 12, and front and rear pivot shafts 20, 21 projecting forwardly and rearwardly, respectively, of the swingable section B. The swingable section B is suspended through the front and rear pivot shafts 20, 21 from machine frame 2 of the non-swingable section A, and is swingable about a horizontal swing axis that interconnects the front and rear pivot shafts 20, 21.

The guide member 18 should preferably comprise an auxiliary roller or slide shoe for keeping the swingable section B spaced a certain height from the ground level.

The engine 11 has a power output shaft 23 for transmitting engine power through a universal joint 22 to the gear case unit 6. A channel 24 is fixed to a rear end of the engine mount pipe 10. The engine 11 has an engine starter grip 25 which can manually be pulled to start the engine 11. The front wheel 3 is covered with a front wheel cover 26 joined to the machine frame 2.

The non-swingable section A and the swingable section B are swingable relatively to each other, and so named in order to distinguish from each other. When the control handle 5 of the non-swingable section A is tilted to the left or the right as viewed from the user of the mowing machine 100, the control handle 5 and the front and rear wheels 3, 4 are swung to the left or the right about the horizontal swing axis.

Figure 2:
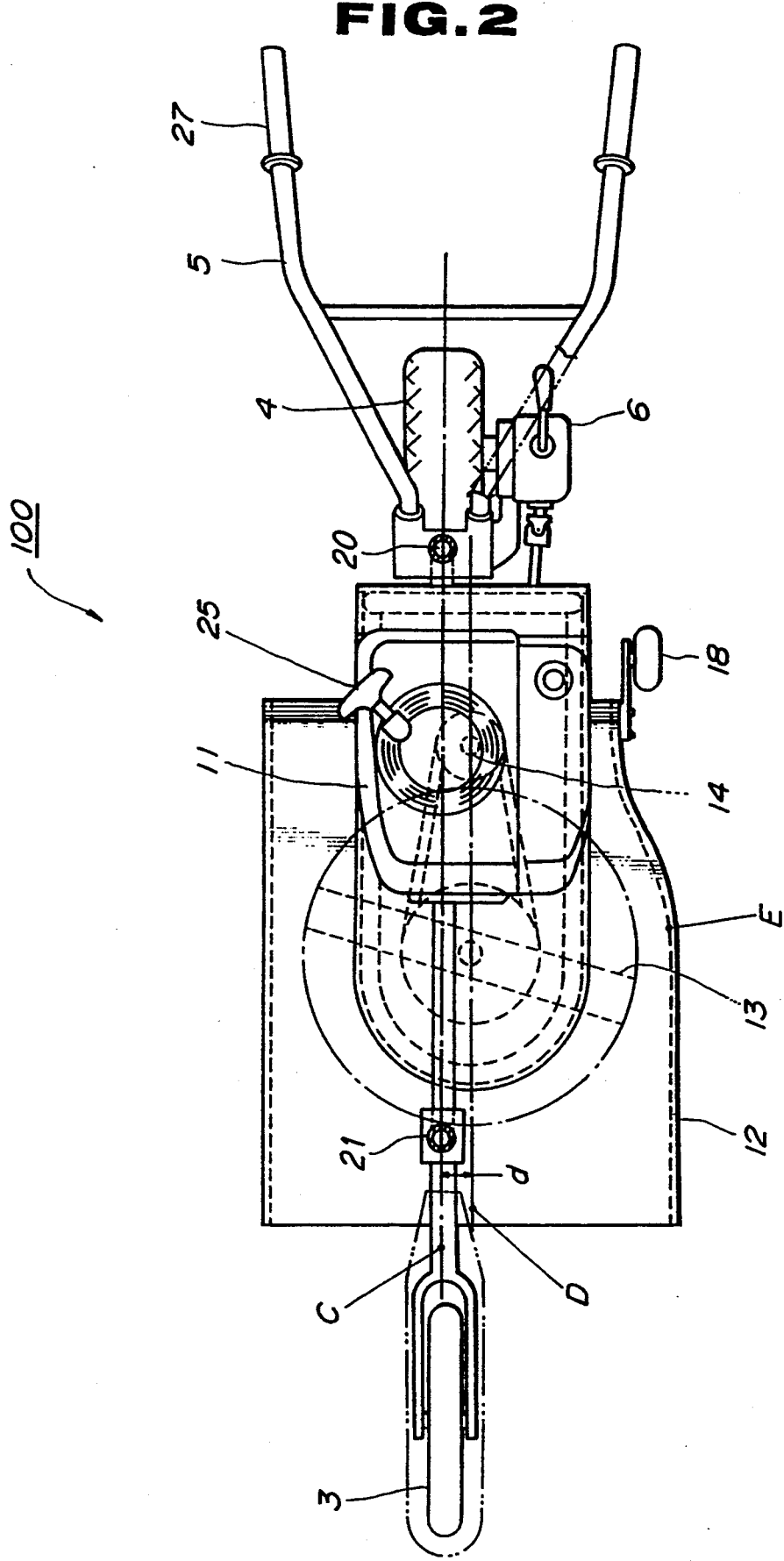
FIG. 2 is a plan view of the mowing machine shown in FIG. 1.

As shown in FIG. 2, the front wheel 3 has a relatively narrow tire, and the rear wheel 4 has a relatively wide tire. The front wheel 3, the front and rear pivot shafts 20, 21, and the rear wheel 4 are positioned in line with each other along an axis C corresponding to the horizontal swing axis and also a longitudinal axis of the non-swingable section A. An axis D which passes through the centers of the crankshaft 14 and the cutting blade 13, and that corresponds to a longitudinal axis passing through the center of gravity of the swingable section B, is displaced laterally from the axis C by a distance d, and extends parallel to the axis C. Because the axis D of the swingable section B is thus laterally offset from the axis C of the non-swingable section A, the swingable section B tends to rotate about the front and rear pivot shafts 20, 21, lowering a side E thereof in a direction away from the viewer of FIG. 2. Therefore, to keep the cutting blade 13 and the cutter housing 12 spaced a certain distance from the ground surface for thereby preventing them from directly contacting the ground surface, the guide member 18 is mounted on one side of the cutter housing 12 to maintain the cutter housing 12 spaced from ground.

Operation of the mowing machine 100 shown in FIGS. 1 and 2 will be described below.

In FIG. 1, the engine starter grip 25 is manually pulled to start the engine 11, and a cutting blade lever 28 near one grip 27 of the control handle 5 is pushed to a position "ON" thereby rotating the cutting blade 13. A propelling lever 29 behind the cutting blade lever 28 is shifted from a "STOP" position to a "RUN" position thereby rotating the rear wheel 4 to propel the mowing machine 100.

While the mowing machine 100 is moving, it is necessary for the user to hold the control handle 5 with a certain manual force. More specifically, while the mowing machine 100 is moving, the swingable section B is stable as it is supported by the front wheel 3, the rear wheel 4, and the guide member 18. However, the non-swingable section A has to be manually supported as it is supported only by the front and rear wheels 3, 4. The burden on the user is however small as the user is required to hold only the non-swingable section A.

Figure 3:
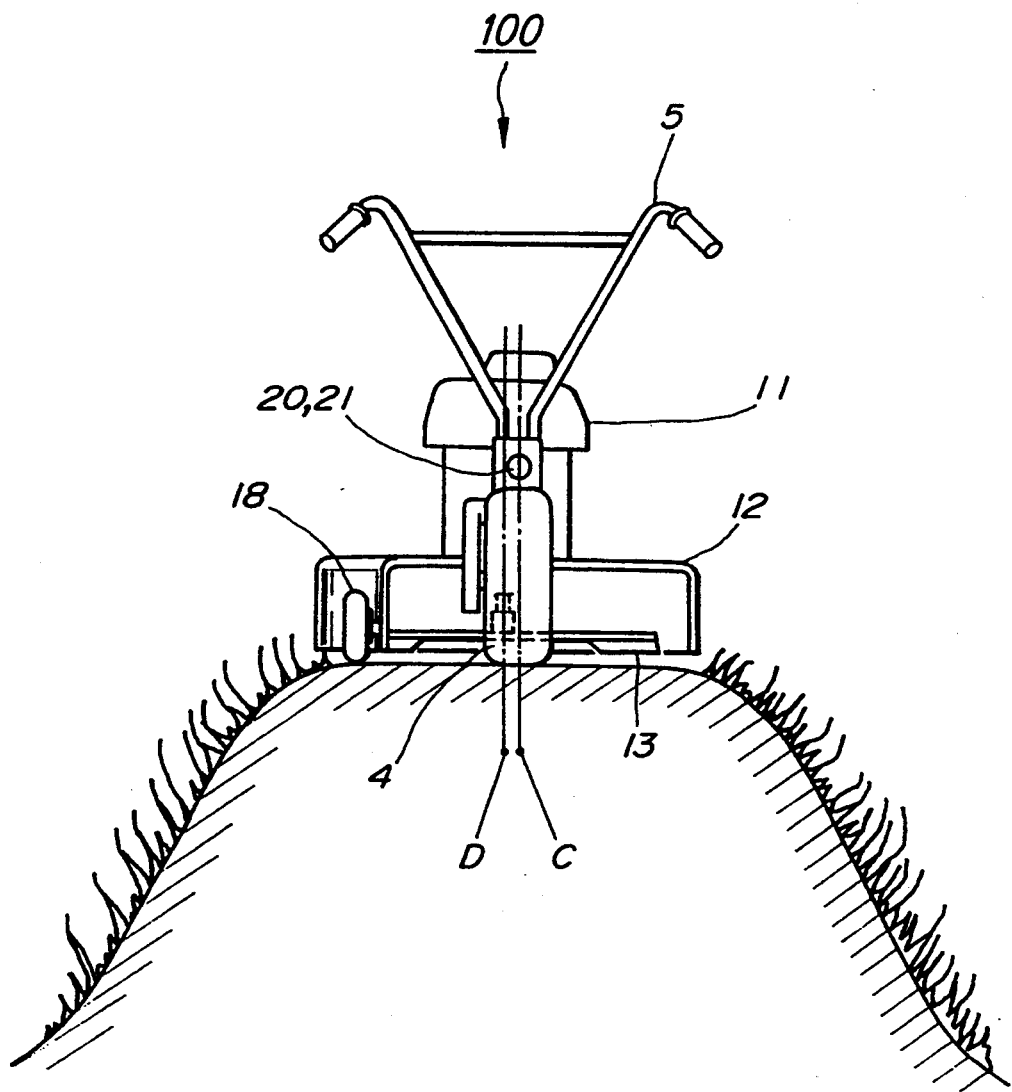
FIG. 3 is a rear elevational view of the mowing machine shown in FIG. 1 as it mows the upper surface of a ridge.

FIG. 3 shows in rear elevation the mowing machine 100 as it mows the upper surface of a ridge. The non-swingable section A including the rear wheel 4 and the control handle 5 is directed substantially vertically, and the swingable section B including the cutter housing 12 and the cutting blade 13 is held substantially horizontally while mowing the upper surface of the ridge.

Figure 4:
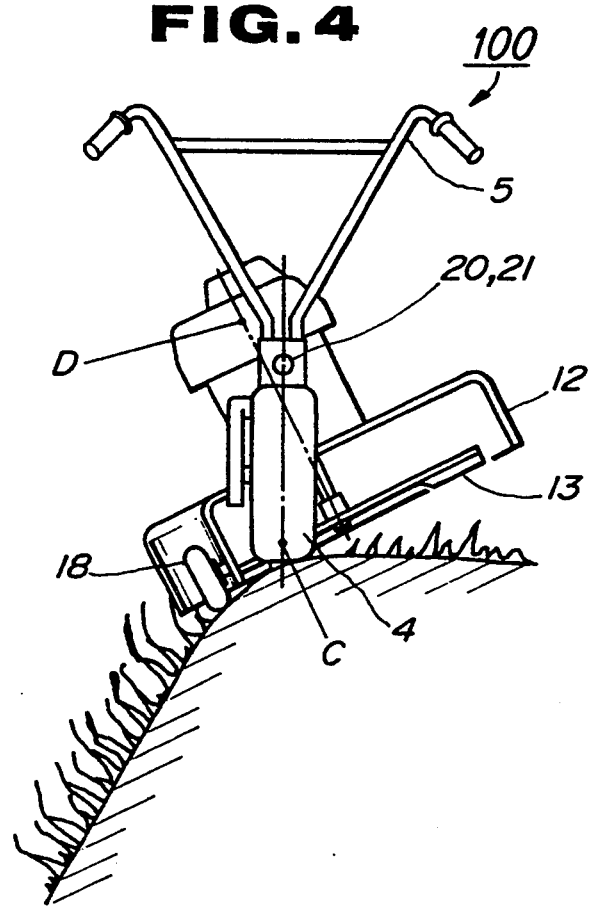
FIG. 4 is a rear elevational view of the mowing machine shown in FIG. 1 as it mows a corner of a ridge.

FIG. 4 shows in rear elevation the mowing machine 100 as it mows a corner of a ridge. The non-swingable section A including the rear wheel 4 and the control handle 5 remains directed substantially vertically. However, the swingable section B is angularly moved about the front and rear pivot shafts 20, 21, causing the cutter housing 12 and the cutting blade 13 to be tilted downwardly to the left while mowing the corner of the ridge.

Figure 5:
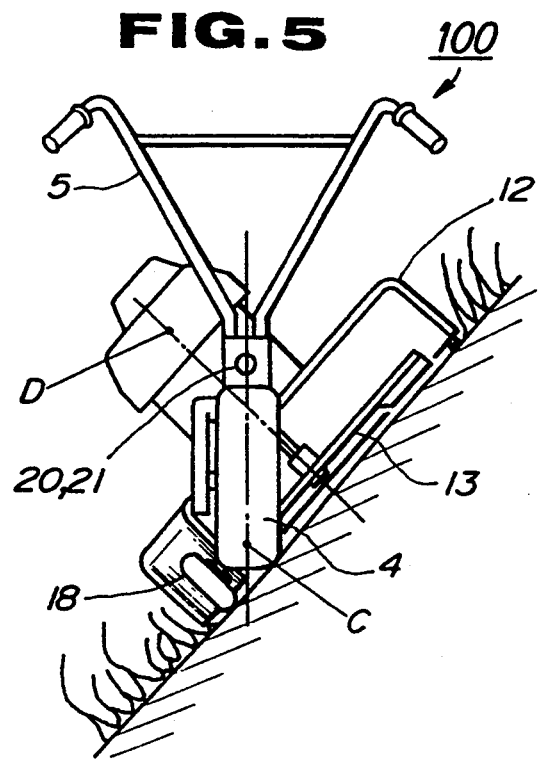
FIG. 5 is a rear elevational view of the mowing machine shown in FIG. 1 as it mows a slanted surface of a ridge.

FIG. 5 illustrates in rear elevation the mowing machine 100 as it mows a slanted surface of a ridge. The non-swingable section A including the rear wheel 4 and the control handle 5 remains directed substantially vertically. However, the swingable section B is angularly moved to a greater extent about the front and rear pivot shafts 20, 21, causing the cutter housing 12 and the cutting blade 13 to be tilted downwardly to face the slanted surface while mowing the slanted surface of the ridge.

When the mowing machine 100 that has mowed the slanted surface of the ridge reaches an end of the ridge, the mowing machine 100 is turned 180° and starts to mow an opposite slanted surface of the ridge.

As shown in FIGS. 3 through 5, the front and rear wheels 3, 4 of the mowing machine 100 are held substantially vertically irrespective of whether the mowing machine 100 mows a horizontal surface, a corner, or a slanted surface. Since the user of the mowing machine 100 tends to stand vertically on a slanted surface, the user can easily hold the control handle 5 vertical on such a slanted surface. The mowing machine 100 can travel forwardly on the slanted surface without lateral slippage as the front and rear wheels 3, 4 slightly bite into the slanted surface.

While the single wide rear wheel 4 is employed in the above embodiment, two narrow rear wheels may be used on the mowing machine. A three-wheeled mowing machine with a single front wheel and two rear wheels can stably run on a flat field and makes an easier turn than the two-wheeled mowing machine.

In the mowing machine 100 according to the first embodiment, at least a cutting assembly including the cutting housing 12 and the cutting blade 13 is mounted on the machine frame 2 for swinging movement about the swing axis that extends along the direction in which the mowing machine 100 can run straight forwardly. The front and rear wheels 3, 4 and the control handle 5 supported on the machine frame 2 are thus held substantially vertical, and the user of the mowing machine is subject to a less burden trying to keep the control handle 5 vertical. In the case where the mowing machine 100 has a single front wheel and a single rear wheel, the mowing machine 100 can easily travel on a slanted surface while the front and rear wheels are being held vertical on the slanted surface, with the result that the burden on the user is greatly reduced. The swingable section B including the cutting blade 13 is attached to the non-swingable section A in offset relationship thereto, and the guide member 18 is mounted on a lower portion of the swingable section B. The swingable section B is thus spaced from ground by the guide member 18 and the front and rear wheels 3, 4 for allowing the mowing machine 100 to travel stably.

Figure 6:
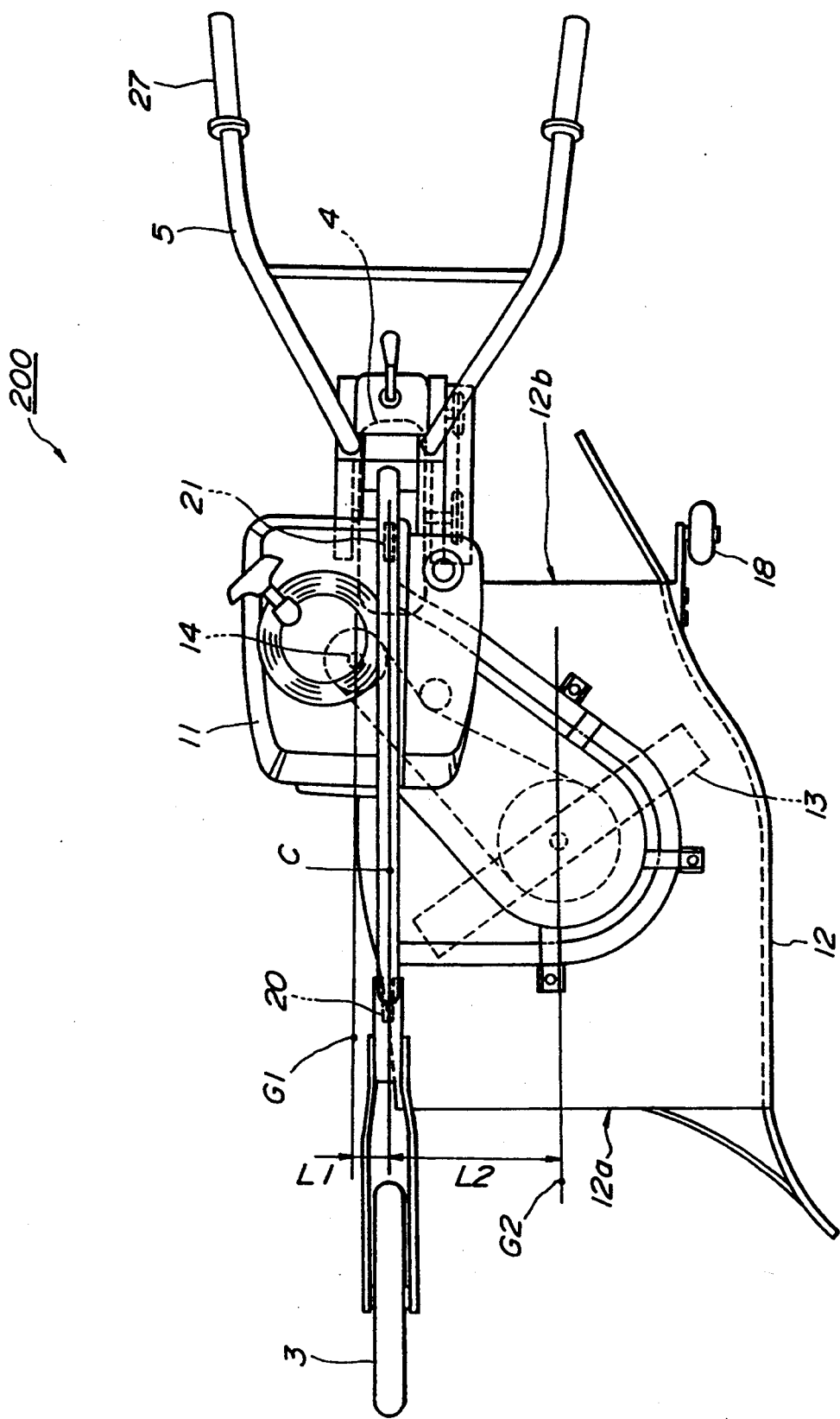
FIG. 6 is a plan view of a mowing machine according to a second embodiment of the present invention.

FIG. 6 shows in plan a mowing machine 200 according to a second embodiment of the present invention. Those parts of the mowing machine 200 which are identical to those of the mowing machine 100 are denoted by identical reference numerals, and will not be described in detail below. The mowing machine 200 differs from the mowing machine 100 in that the center of the engine 11 is positioned on the righthand side, as viewed from the user, of the swing axis C that interconnects the front and rear pivot shafts 20, 21, and the center of the cutter housing 12 is positioned on the lefthand side of the swing axis C.

More specifically, the cutter housing 12 is mostly located on the lefthand side of the swing axis C, with the result that a grass inlet 12a and a grass outlet 12b of the cutter housing 12 are positioned on the lefthand side, as viewed from the user, of the swing axis C. This arrangement allows the mowing machine 200 to be positioned easily with respect to a strip of grass to be mowed and also to mow the grass for a width corresponding to the grass inlet 12a simply by moving the front wheel 3 along the righthand edge of the strip of grass.

In FIG. 6, a center-of-gravity line G1 that passes through an engine assembly including the engine 11 and parallel to the axis C is spaced a distance L1 from the swing axis C, and a center-of-gravity line G2 that passes through a cutting assembly including the cutting blade 13 and the cutter housing 12 and parallel to the swing axis C is spaced a distance L2 from the swing axis C. The engine assembly and the cutting assembly are arranged such that the moment (the load on the center of gravity of the cutting assembly $\times$ L2) applied to the cutting assembly about the swing axis C is slightly greater than the moment (the load on the engine assembly $\times$ L1) applied to the engine assembly about the swing axis C. This arrangement keeps the guide member 18 held in contact with ground at all times. Since the difference between the moments is very small, the engine assembly and the cutting assembly are substantially held in equilibrium. Thus, the user can easily control the mowing machine 200, and any burden on the user while moving the mowing machine 200 on flat fields is small.

Figure 7:
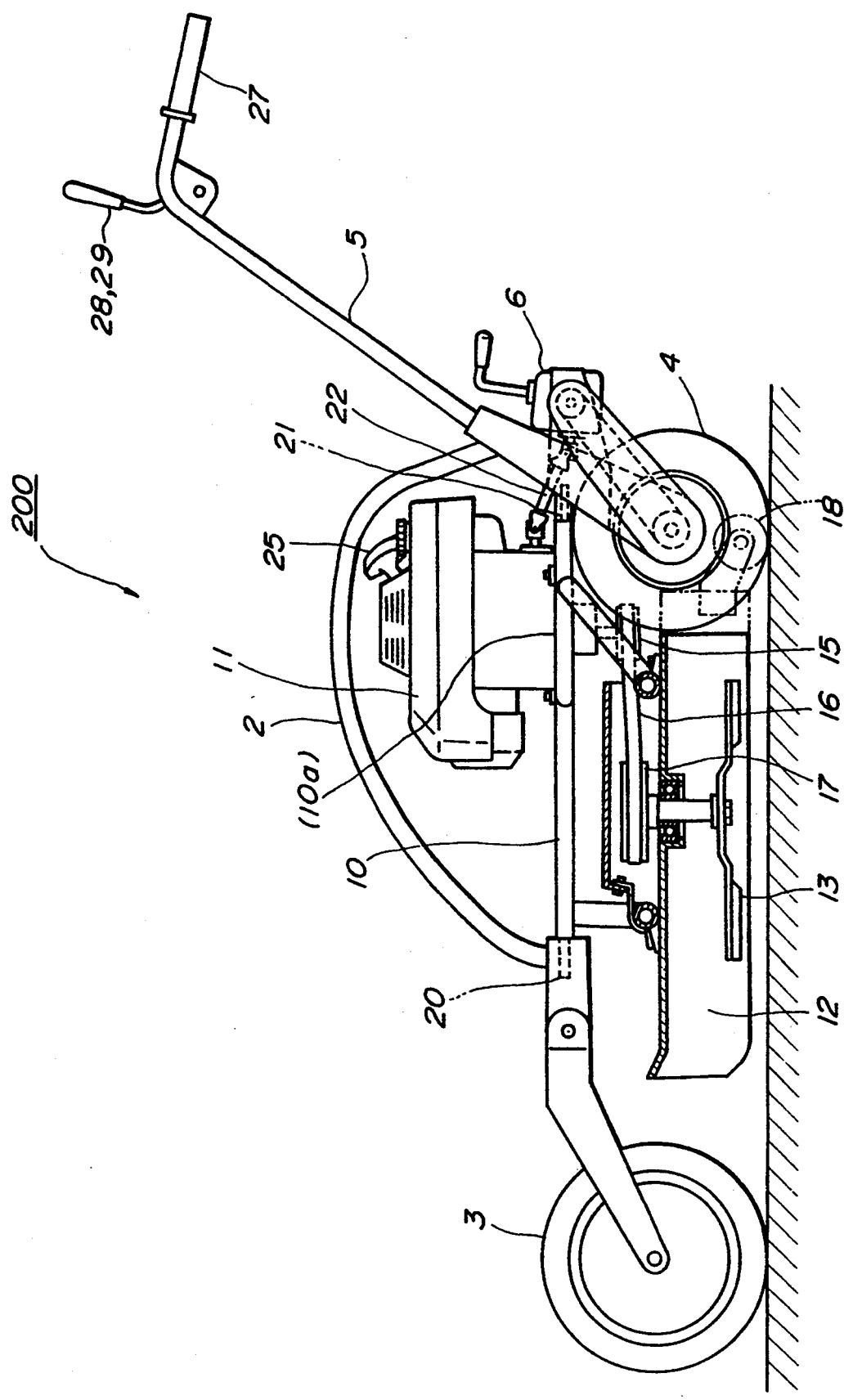
FIG. 7 is a side elevational view, partly in cross section, of the mowing machine shown in FIG. 6.

The mowing machine 200 is shown in side elevation in FIG. 7. As shown in FIG. 7, the rear wheel 4 of the mowing machine 200 is closer to the front wheel 3 thereof than the mowing machine 100 shown in FIG. 1. The rear wheel 4 may be in this position because the cutter housing 12 is laterally displaced toward the viewer of FIG. 7 out of physical interference with the rear wheel 4, and also because the engine 11 is lifted to create a space therebelow which can accommodate at least a front portion of the rear wheel 4.

Consequently, the user of the mowing machine 200 can place his body closer to the mowing machine 200, and the mowing machine 200 may be reduced in length for easy maneuverability for turns or the like.

A mowing machine according to a third embodiment of the present invention will be described below.

Figure 8:
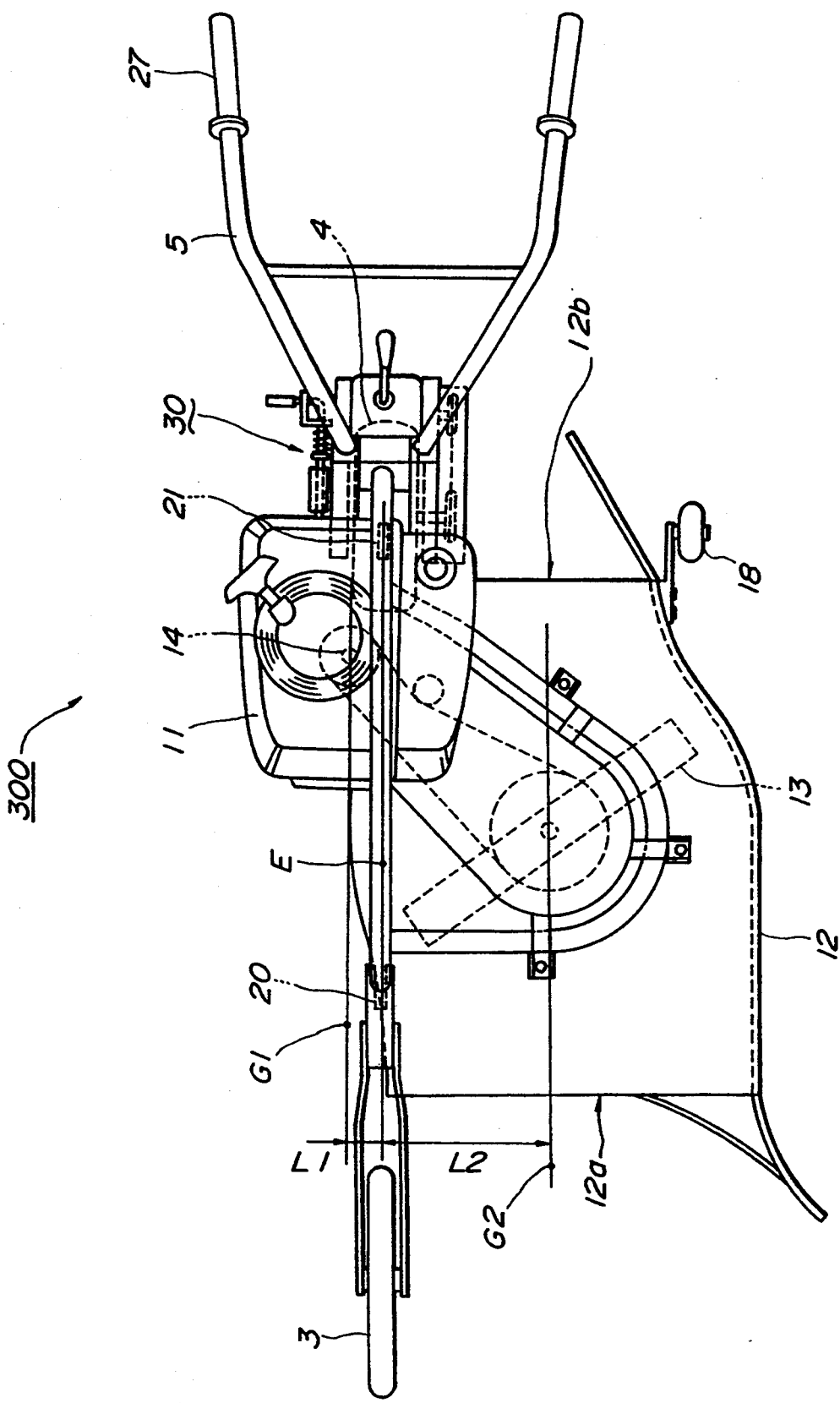
FIG. 8 is a plan view of a mowing machine according to a third embodiment of the present invention.

FIG. 8 shows the mowing machine, generally indicated by 300, according to the third embodiment. The mowing machine 300 is similar to the mowing machine 200 shown in FIGS. 6 and 7, but differs therefrom in that an angular range limiting mechanism 30 is located laterally of the rear wheel 4.

Figure 9:
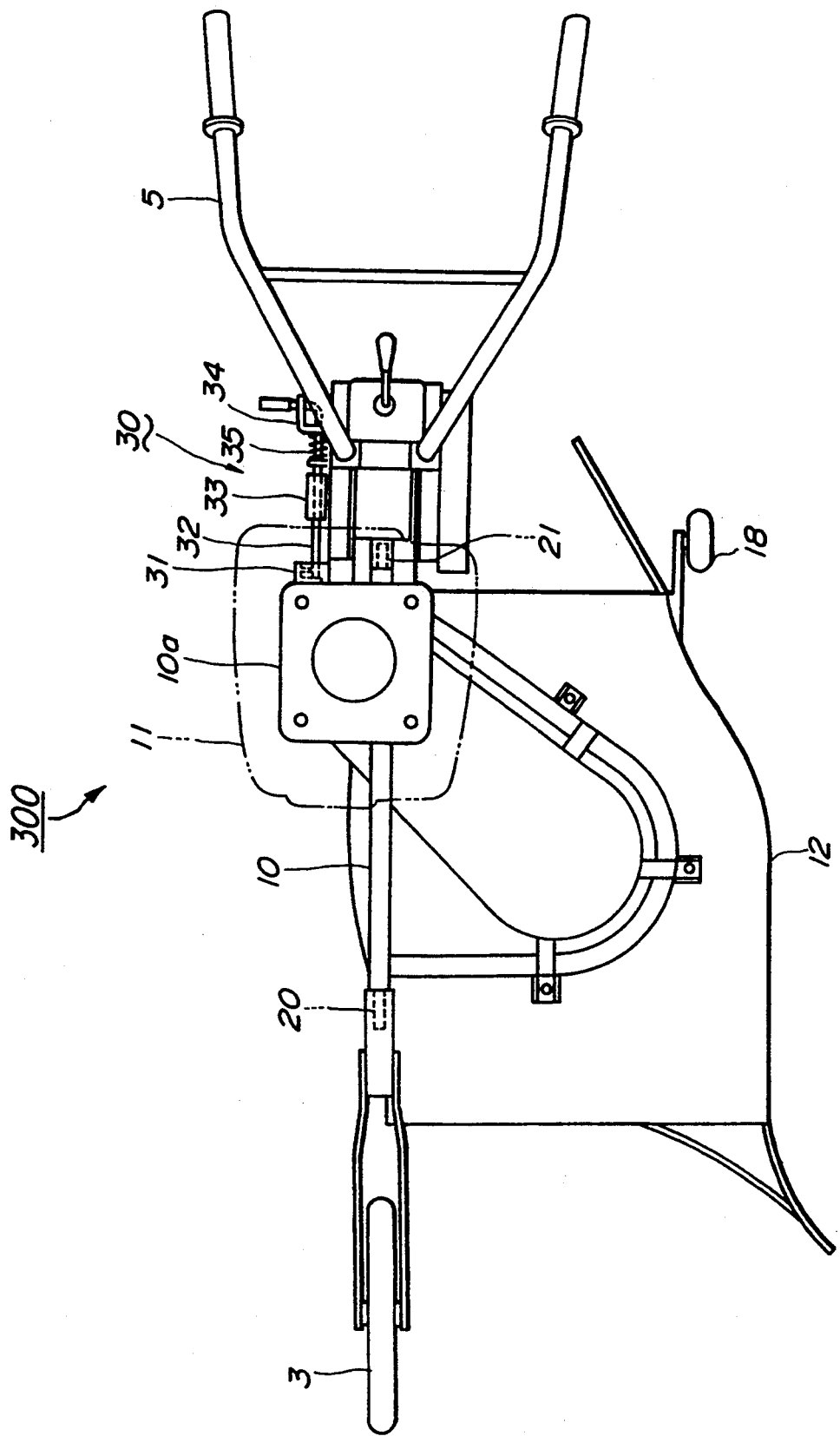
FIG. 9 is a plan view of the mowing machine shown in FIG. 8, with an engine omitted from illustration.

FIG. 9 shows the mowing machine 300 with the engine omitted from illustration. The angular range limiting mechanism 30 comprises a shift block 31 attached to the engine mount base 10a, an L-shaped lever 32 having an end inserted in the shift block 31, a lever guide 33 attached to the control handle 5, a shift plate 34 attached to the control handle 5, and a spring 35 coiled around the L-shaped lever 32 for urging the shift plate 34.

Figure 10:
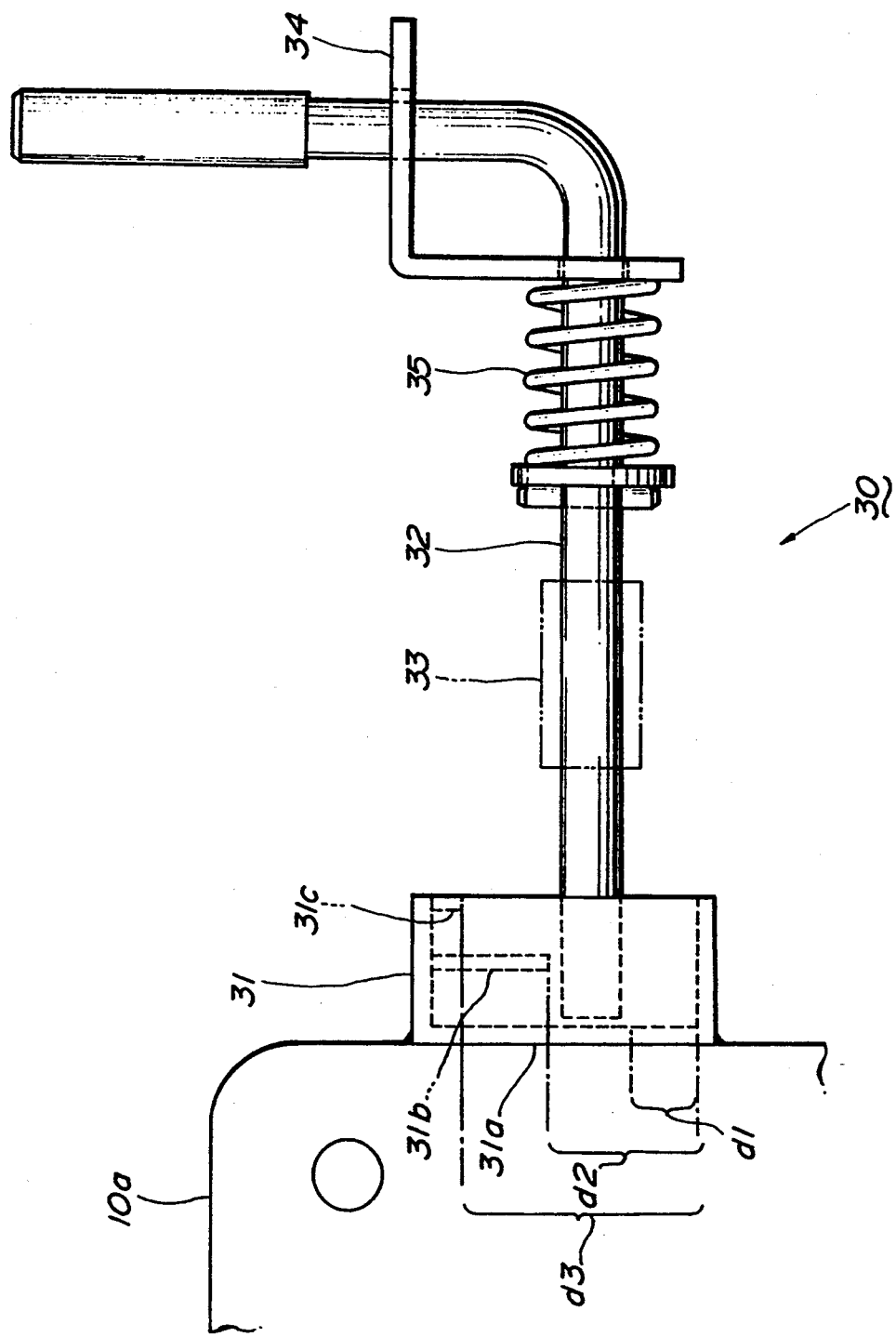
FIG. 10 is a plan view of an angular range limiting mechanism of the mowing machine shown in FIG. 8.

As shown in FIG. 10, the shift block 31 is in the form of a box housing a first plate 31a, a second plate 31b, and a third plate 31c that are spaced from each other and arranged successively closer to the shift plate 34. The first plate 31a has a smaller-diameter hole d1 defined therein, the second plate 31b has a medium-diameter hole d2 defined therein, and the third plate 31c has a larger-diameter hole d3 defined therein.

Figure 11:
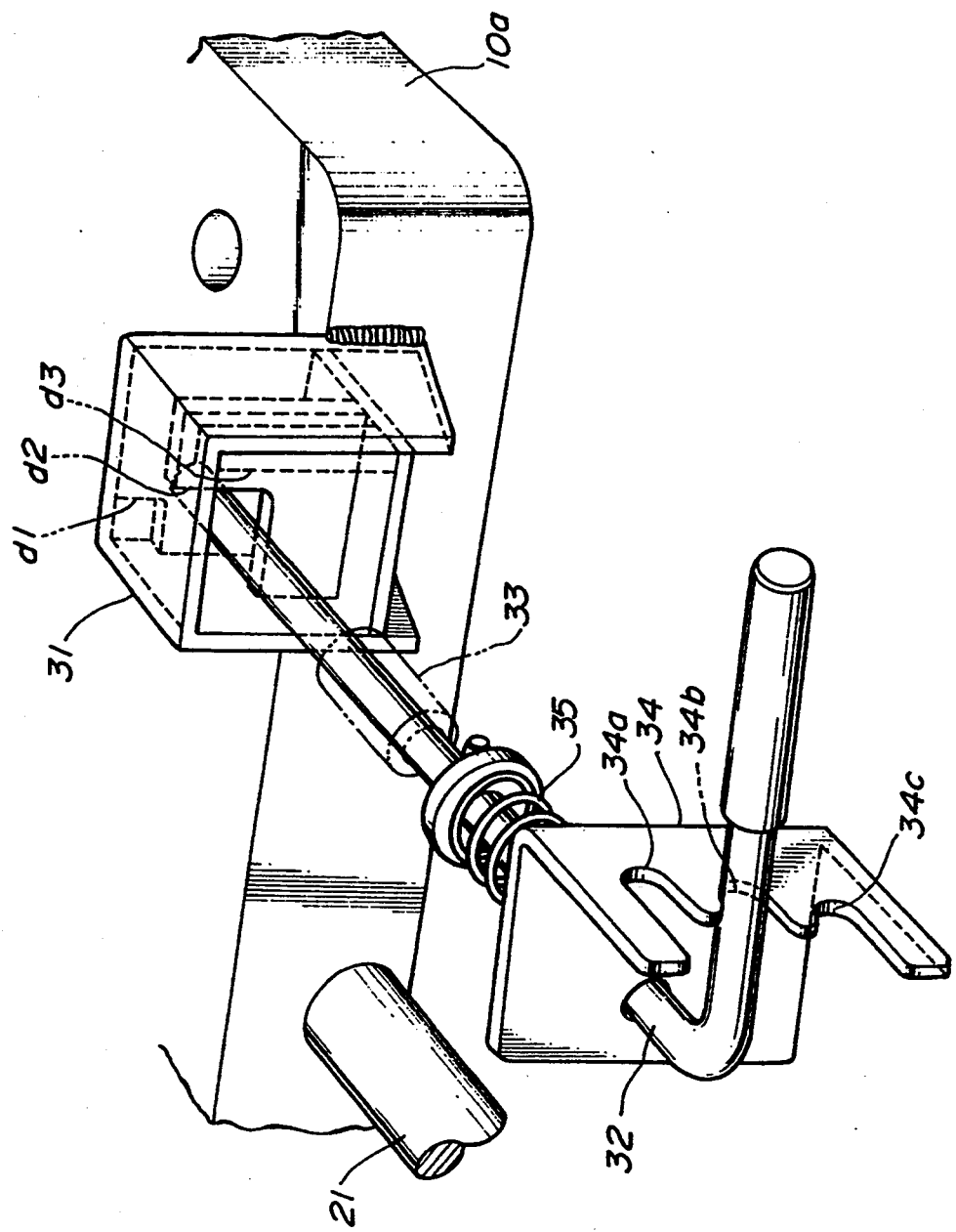
FIG. 11 is a perspective view of the angular range limiting mechanism shown in FIG. 10.

As shown in FIG. 11, the shift plate 34 has a first recess 34a of a larger depth, a second recess 34b of a medium depth, and a third recess 34c of a smaller depth. The first, second, and third recesses 34a, 34b, 34c are spaced from each other and extend parallel to each other. The L-shaped lever 32 can be fitted selectively in the first, second, and third recesses 34a, 34b, 34c.

Figure 12:
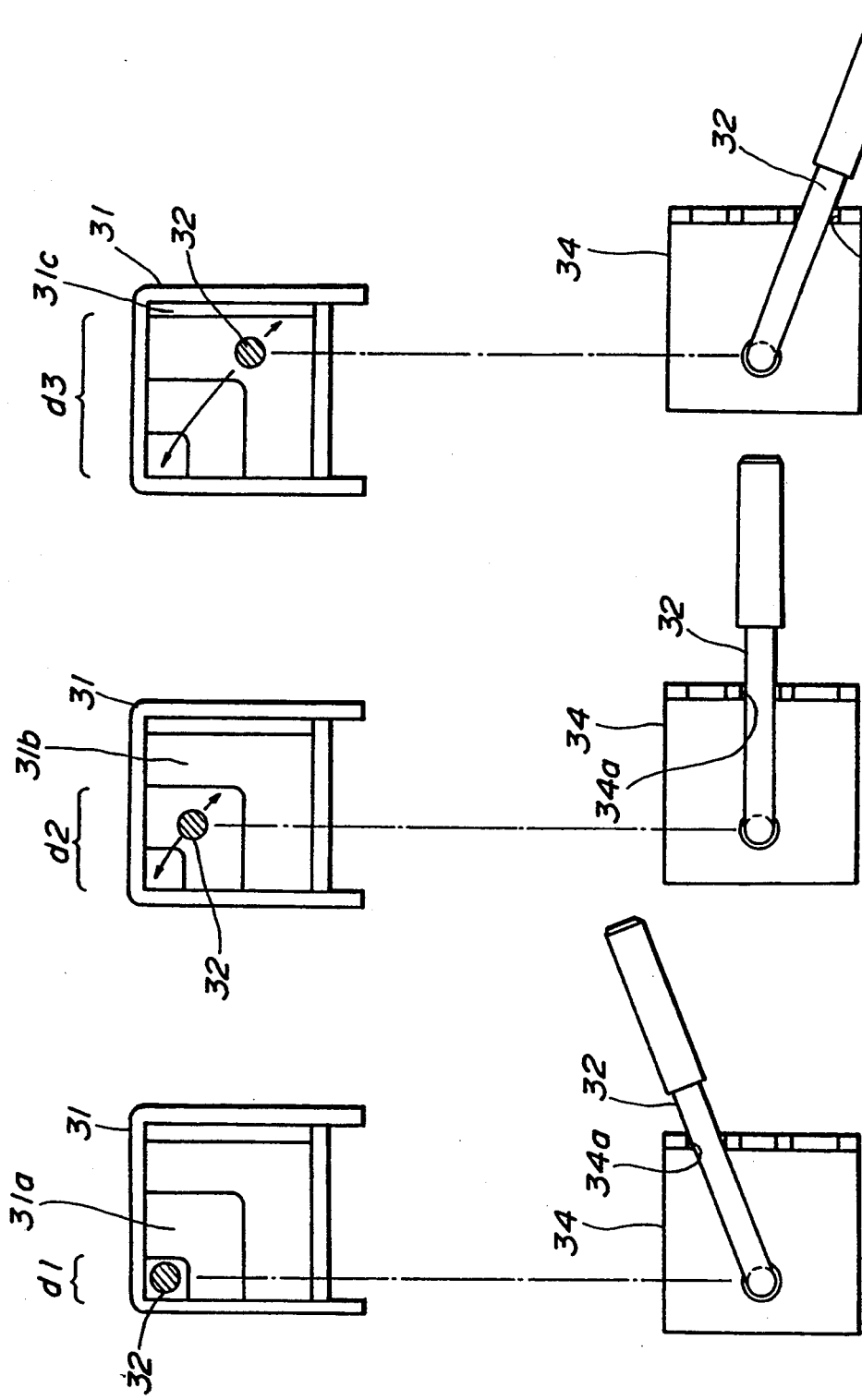
FIG. 12(a) is a view of the angular range limiting mechanism when a first mode is selected.
FIG. 12(b) is a view of the angular range limiting mechanism when a second mode is selected.
FIG. 12(c) is a view of the angular range limiting mechanism when a third mode is selected.

The mowing machine 300 operates as follows:

FIGS. 12(a), 12(b), and 12(c) show the manner in which the angular range limiting mechanism 30 operates.

The angular range limiting mechanism 30 operates selectively in a first mode, a second mode, and a third mode. In the first mode, the L-shaped lever 32 is set in the first recess 34a, and moves forwardly with its end placed in the smaller-diameter hole d1 of the first plate 31a, as shown in FIG. 12(a). In the second mode, the L-shaped lever 32 is set in the second recess 34b, and moves slightly rearwardly with its end placed in the medium-diameter hole d2 of the second plate 31b, as shown in FIG. 12(b). The lever 32 is movable laterally within the range of the medium-diameter hole d2. In the third mode, the L-shaped lever 32 is set in the third recess 34c, and moves further rearwardly with its end placed in the larger-diameter hole d3 of the third plate 31c, as shown in FIG. 12(c). The lever 32 is movable laterally within the range of the larger-diameter hole d3.

Since the engine mount pipe 10, the engine mount base 10a, the engine 11, and the cutter housing 12 are integrally coupled to each other, the swingable section B is operatively coupled to the non-swingable section A by the mechanical connection of the engine mount 10a to the control handle 5 through the L-shaped lever 32. The cutter housing 12, which is the largest of all the components of the mowing machine 300 will be regarded as representing the swingable section B.

Figure 13:
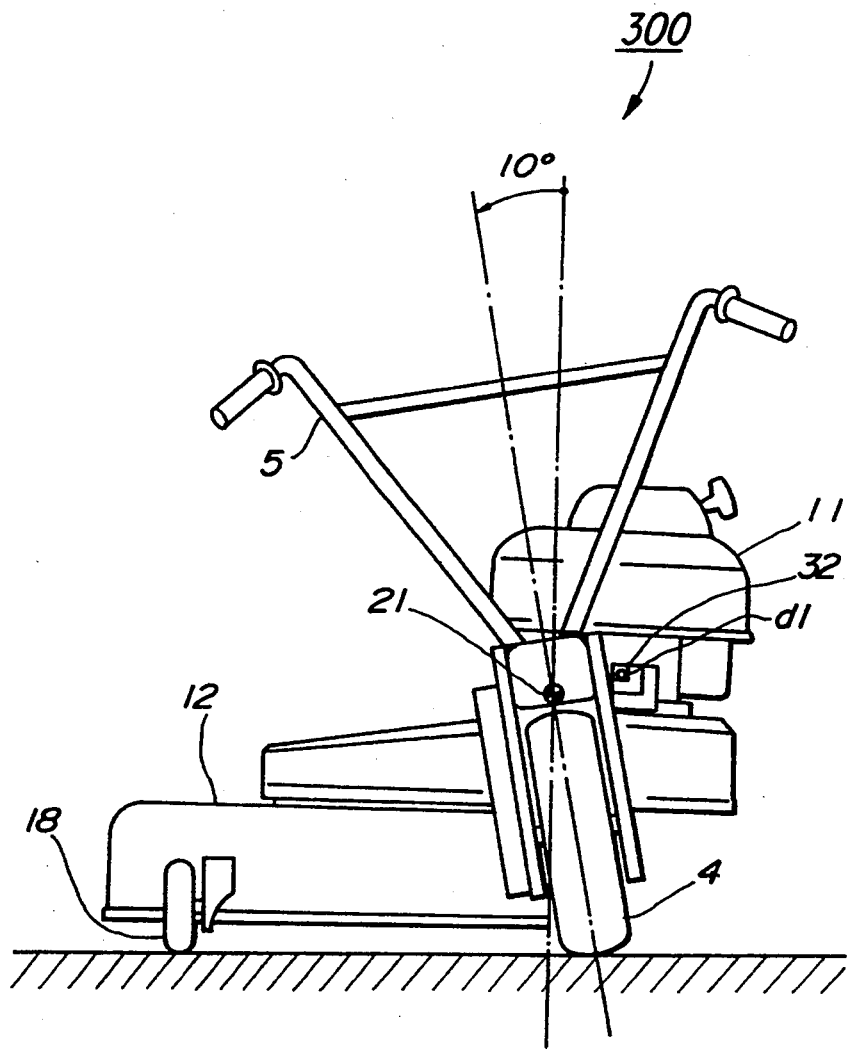
FIG. 13 is a rear elevational view of the mowing machine shown in FIG. 8 which is in the first mode.

FIG. 13 shows in rear elevation the mowing machine 300 in the first mode. As shown in FIG. 13, the cutter housing 12 projects largely to the right, and the guide member 18 is in contact with the ground. In FIG. 13, the control handle 5 is tilted about 10° to the left from the position in which it extends perpendicularly to the cutter housing 12, with the lever 32 in the smaller-diameter hole d1 as shown in FIG. 12(a). Thus, the control handle 5 which is relatively light is locked by the cutter housing 12 which relatively heavy. Stated otherwise, the swingable section B is fixed to the non-swingable section A. The first mode is a parking mode, and is suitable for parking the mowing machine 300 or starting the engine 11.

Figure 14:
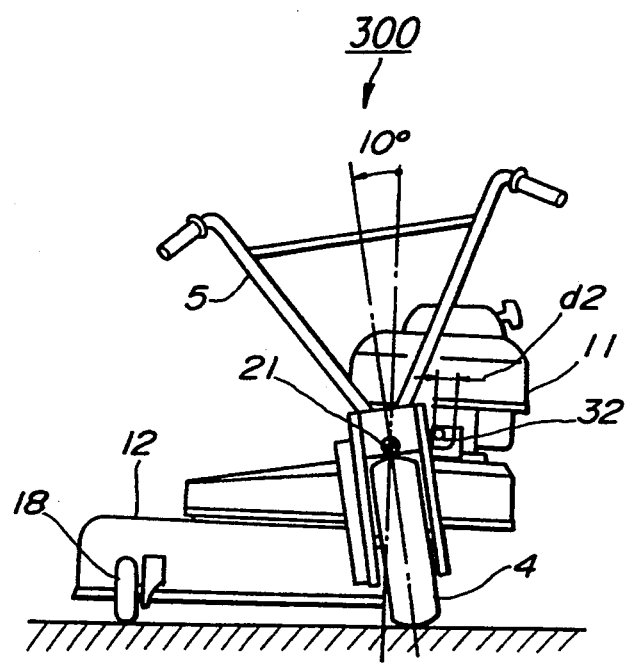
FIG. 14(a) is a rear elevational view of the mowing machine shown in FIG. 8 when a control handle thereof is tilted to the left while a lever of the angular range limiting mechanism in the second mode is abutting against one end of an angular range.
FIG. 14(b) is a rear elevational view of the mowing machine shown in FIG. 8 when the control handle thereof is held vertical with respect to ground while the lever of the angular range limiting mechanism in the second mode is abutting against another end of the angular range.
FIG. 14(c) is a rear elevational view of the mowing machine shown in FIG. 8 when the control handle thereof is tilted to the right while the lever of the angular range limiting mechanism in the second mode is abutting against the other end of the angular range.
Figure 14:
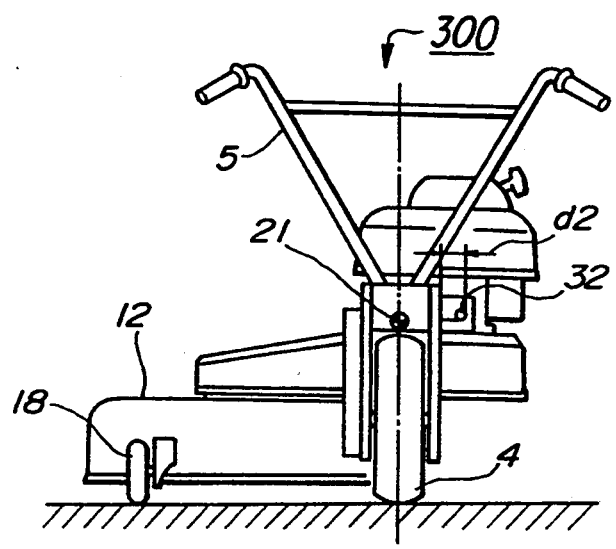
Figure 14:
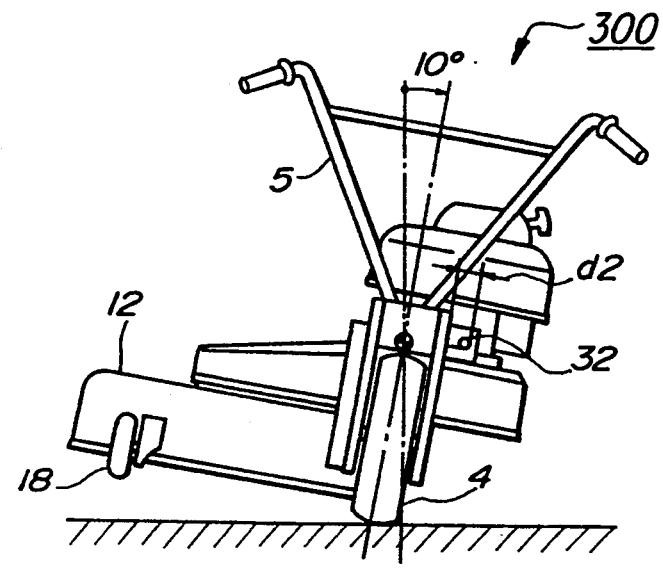

FIGS. 14(a), 14(b), and 14(c) show in rear elevation various operating conditions of the mowing machine 300 in the second mode. In the second mode, the end of the lever 32 is inserted in the medium-diameter hole d2, and is laterally movable in the range of the medium-diameter hole d2.

In FIG. 14(a), the lever 32 is held in abutment against a lefthand end of the medium-diameter hole d2, and the control handle 5 is tilted 10° to the left from the vertical position.

FIG. 14(b) shows the mowing machine 300 after the control handle 5 is tilted 10° to the right from the position shown in FIG. 14(a). In FIG. 14(b), the control handle 5 extends perpendicularly to the cutter housing 12, i.e., the ground surface, and the user of the mowing machine 300 can easily operate on the control handle 5.

FIG. 14(c) shows the mowing machine 300 after the control handle 5 is tilted 10° to the right from the position shown in FIG. 14(b). Since the lever 32 has pushed a righthand end of the medium-diameter hole d2, the guide member 18 is lifted off ground.

The second mode is thus a mode suitable for allowing the mowing machine 300 to mow a substantially horizontal field which may include slightly slanted surfaces inclined several degrees from the horizontal plane.

Figure 15:
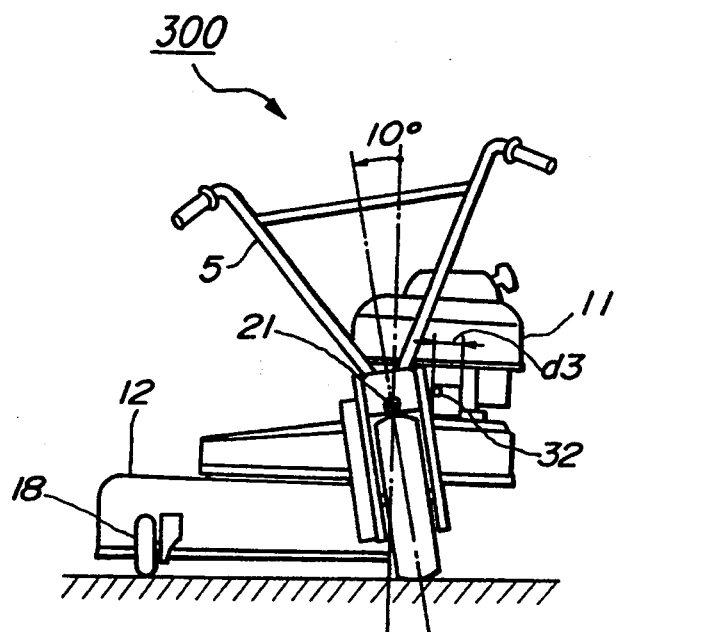
FIG. 15(a) is a rear elevational view of the mowing machine shown in FIG. 8 when the control handle thereof is tilted to the left while the lever of the angular range limiting mechanism in the third mode is abutting against the one end of the angular range.
FIG. 15(b) is a rear elevational view of the mowing machine shown in FIG. 8 when the control handle thereof is tilted to the right while the lever of the angular range limiting mechanism in the third mode is abutting against the other end of the angular range.
FIG. 15(c) is a rear elevational view of the mowing machine shown in FIG. 8 which is placed on a slanted surface of a ridge.
Figure 15:
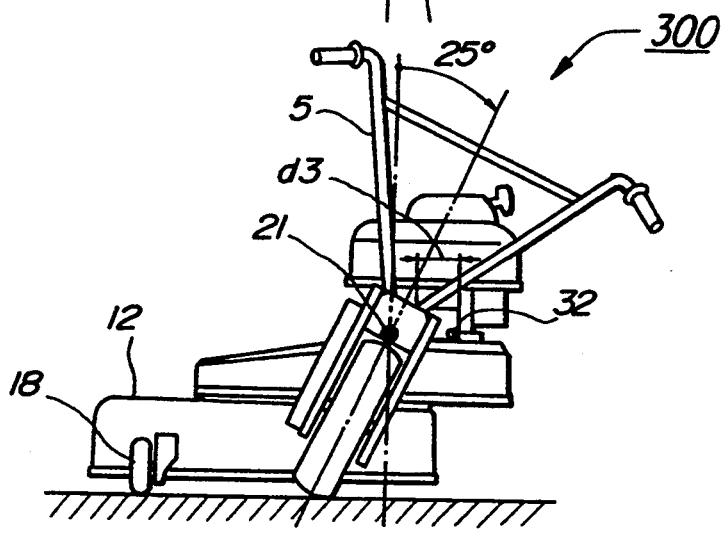
Figure 15:
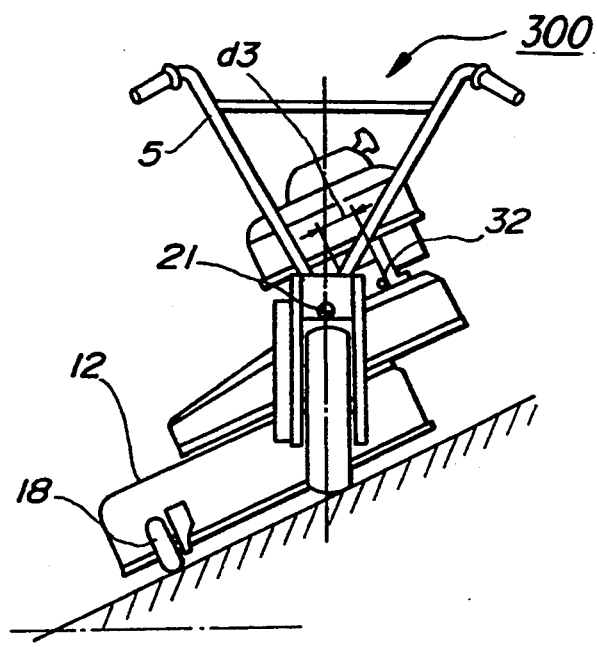
Figure 16:
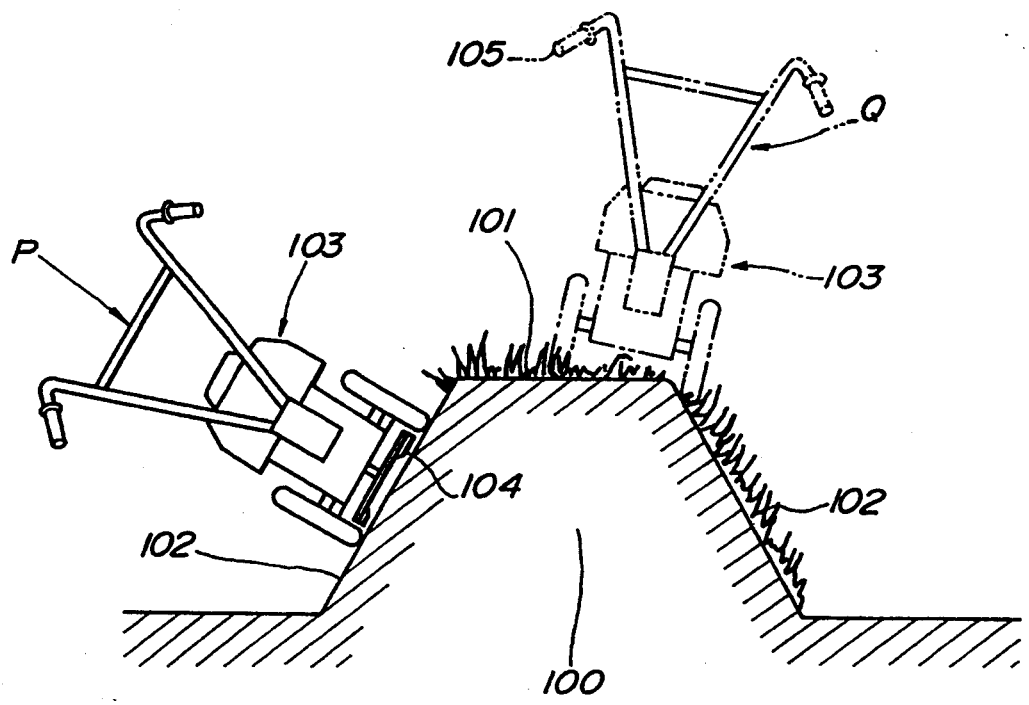
FIG. 16 is a cross-sectional view of an ideal ridge as it is mowed by a conventional mowing machine.
Figure 17:
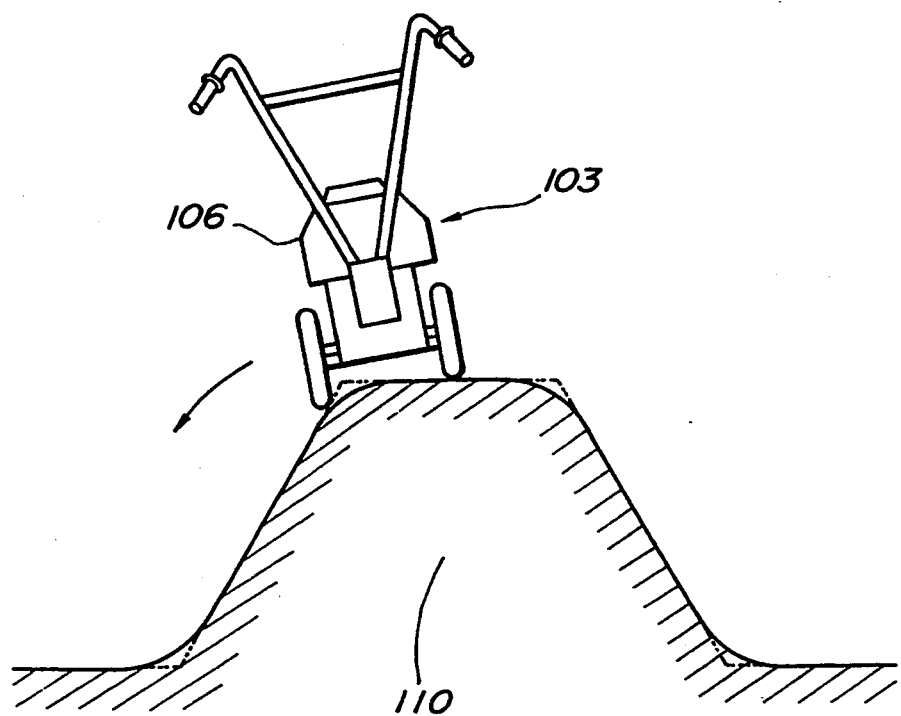
FIG. 17 is a cross-sectional view of an actual ridge as it is mowed by the conventional mowing machine.

FIGS. 15(a), 15(b), and 15(c) illustrate in rear elevation various operating conditions of the mowing machine 300 in the third mode. In the third mode, the end of the lever 32 is inserted in the larger-diameter hole d3, and is laterally movable in the range of the larger-diameter hole d3.

In FIG. 15(a), the lever 32 is held in abutment against the lefthand end of the larger-diameter hole d3, and the control handle 5 is tilted 10° to the left from the vertical position.

FIG. 15(b) shows the mowing machine 300 after the control handle 5 is tilted 25° to the right from the vertical position until the lever 32 abuts against the righthand end of the larger-diameter hole d3. In the third mode, therefore, the control handle 3 can be angularly moved through an angle of 35° ranging from −10° to +25°.

FIG. 15(c) shows the mowing machine 300 shown in FIG. 15(b) which is placed on a slanted surface which is inclined 25° from the horizontal plane. The third mode is therefore a mode suitable for allowing the mowing machine 300 to mow a slanted surface because the cutter housing 12 can lie on the slanted surface while holding the control handle 5 vertical. Inasmuch as the third mode covers the angular range from −10° to +25°, the mowing machine 300 can mow slanted surfaces whose angle ranges from the horizontal plane to about 25°.

To start to operate the mowing machine 300, the first mode is selected, and the engine starter grip 25 is manually pulled to start the engine 11. Then, the second mode or the third mode is selected, and the cutting blade lever 28 is pushed to the position "ON" thereby rotating the cutting blade 13. The propelling lever 29 is shifted from the "STOP" position to the "RUN" position thereby rotating the rear wheel 4 to propel the mowing machine 100.

When the first mode is selected to fix the swingable section B to the control handle 5, i.e., to substantially eliminate any angular range of the control handle 5, the control handle 5 is fixed with respect to the cutter housing 12. Thus, the first mode is suitable for parking the mowing machine 300 or starting the engine 11.

Although there have been described what are at present considered to be the preferred embodiments of the invention, it will be understood that the invention may be embodied in other specific forms without departing from the essential characteristics thereof. The present embodiments are therefore to be considered in all respects as illustrative, and not restrictive. The scope of the invention is indicated by the appended claims rather than by the foregoing description.

What is claimed is:

1. A non-riding type mowing machine comprising:
a machine frame;
front and rear wheels rotatably mounted on said machine frame;
a control handle for manually supporting said machine frame, said control handle being mounted on said machine frame; and
a cutting assembly suspended by said machine frame between said front and rear wheels for angular movement about a swing axis extending along a direction in which the mowing machine can travel straight.

2. A mowing machine according to claim 1, wherein said front and rear wheels comprise single wheels, respectively.

3. A mowing machine according to claim 1, wherein said machine frame, said front and rear wheels, and said control handle jointly serve as a non-swingable section, and said cutting assembly serves as a swingable section, said swingable section being suspended in offset relationship to said swing axis, said swingable section including a guide member for keeping said cutting assembly spaced from ground.

4. A mowing machine comprising:
a machine frame;
front and rear wheels rotatably mounted on said machine frame;
a control handle mounted on said machine frame;
a single cutting assembly suspended by said machine frame for angular movement about a swing axis extending along a direction in which the mowing machine can travel straight; and
wherein said machine frame, said front and rear wheels, and said control handle are rigidly secured together to jointly serve as a non-swingable section, and said cutting assembly serves as a swingable section swingable about said swing axis with respect to said non-swingable section, said swingable section further including an engine assembly having at least an engine for supplying drive power to said cutting assembly and said rear wheel as a drive wheel, said engine assembly having a center of gravity positioned on one side of said swing axis, said cutting assembly having a center of gravity positioned on the other side of said swing axis.

5. A mowing machine according to claim 4, wherein said cutting assembly comprises a cutting blade rotatable in a horizontal plane and a cutter housing surrounding said cutting blade, said cutting assembly and said engine assembly being arranged such that the moment applied to the center of gravity of said cutting assembly about said swing axis is greater than the moment applied to the center of gravity of said engine assembly about said swing axis, said swingable section including a guide member for keeping said cutting assembly spaced from ground.

6. A mowing machine according to claim 5, wherein said cutting assembly is disposed mostly on said other side of said swing axis, said rear wheel having at least a front portion located below said engine assembly.

7. A mowing machine according to claim 4, further comprising an angular range limiting mechanism for limiting the range of angular movement of said swingable section.

8. A mowing machine according to claim 5, further comprising an angular range limiting mechanism for limiting the range of angular movement of said swingable section, wherein said angular range limiting mechanism is capable of selecting one, at a time, of a plurality of modes representing respective angular ranges, said modes including a mode whose angular range is substantially nil with said swingable section being fixed to said non-swingable section.

9. A non-riding type mowing machine comprising:
a machine frame;
a single front wheel and a single rear wheel which are rotatably mounted on the front and rear of said machine frame, respectively;
a control handle mounted on said machine frame;
a single cutting assembly suspended by said machine frame between said front and rear wheels for angular movement about a swing axis extending along a direction in which the mowing machine can travel straight; and
an engine assembly having at least an engine for supplying drive power to said cutting assembly;
wherein said machine frame, said front and rear wheels, and said control handle are rigidly secured together to jointly serve as a non-swingable section, said cutting assembly and said engine assembly jointly serve as a swingable section swingable about said swing axis with respect to said non-swingable section, and said swingable section includes a guide member mounted on one side of said cutting assembly and, said swingable section is suspended in offset relationship to said swing axis to be rotated about said swing axis while said guide member maintains said one side of said cutting assembly spaced from the ground, whereby, upon mowing a slanted surface, said cutting assembly is tilted so as to adapt itself to the slanted surface while the front and rear wheels are held substantially vertically on the slanted surface for allowing said mowing machine to travel stably.

10. The mowing machine according to claim 9, further comprising an angular range limiting mechanism for limiting the range of angular movement of said swingable section.

11. The mowing machine according to claim 10, wherein said angular range limiting mechanism is capable of selecting one, at a time, of a plurality of modes representing respective angular ranges, said modes including a mode whose angular range is substantially nil with said swingable section being fixed to said non-swingable section.

12. A non-riding type mowing machine comprising:
a machine frame;
front and rear wheels rotatably mounted on said machine frame;
a control handle mounted on said machine frame for manually supporting said machine frame;
a cutting assembly;
an engine assembly having an engine for supplying drive power to said cutting assembly;
mounting means having a swing axis and swingably supported by said machine frame for mounting thereon said cutting and engine assemblies to allow said cutting and engine assemblies to swing together about the swing axis; and
wherein said cutting assembly is suspended in an offset relationship to said swing axis such that, upon mowing a slanted surface, said cutting assembly is tiltable following the slanted surface, while said front and rear wheels are held substantially vertically on the slanted surface.

13. A non-riding type mowing machine according to claim 12, wherein said front and rear wheels each comprise single wheels, respectively.

14. A non-riding type mowing machine according to claim 12, wherein said machine frame, said front and rear wheels, and said control handle are rigidly secured together to serve as a non-swingable section, and said cutting and engine assemblies serve as a swingable section swingable about said swing axis with respect to said non-swingable section, said cutting assembly having a center of gravity positioned on one side of said swing axis and said engine assembly having a center of gravity positioned on the other side of said swing axis.

15. A non-riding type mowing machine according to claim 12, wherein said swingable section includes a guide member for keeping said cutting assembly spaced from the ground.

16. A non-riding type mowing machine according to claim 15, wherein said cutting assembly comprises a cutting blade rotatable in a horizontal plane and a cutter housing surrounding said cutting blade, said cutting assembly and said engine assembly being arranged such that the moment applied to the center of gravity of said cutting assembly about said swing axis is greater than the moment applied to the center of gravity of said engine assembly about said swing axis.

17. A non-riding type mowing machine according to claim 16, wherein said cutting assembly is disposed mostly on said one side of said swing axis, said rear wheel having at least a front portion located below said engine assembly.

18. A non-riding type mowing machine according to claim 14, further comprising an angular range limiting mechanism for limiting the range of angular movement of said swingable section.

19. A non-riding type mowing machine according to claim 14, further comprising an angular range limiting mechanism for limiting the range of angular movement of said swingable section, wherein said angular range limiting mechanism is capable of selecting one at a time of a plurality of modes representing respective angular ranges, said modes including a mode whose angular range is substantially nil with said swingable section being fixed to said non-swingable section.

* * * * *